United States Patent [19]

Poling

[11] 4,287,780

[45] Sep. 8, 1981

[54] SNAP-ACTION MEMBER

[75] Inventor: Ronald W. Poling, Morrison, Ill.

[73] Assignee: General Electric Company, Fort Wayne, Ind.

[21] Appl. No.: 63,703

[22] Filed: Aug. 6, 1979

Related U.S. Application Data

[62] Division of Ser. No. 960,172, Nov. 13, 1978, Pat. No. 4,200,776.

[51] Int. Cl.³ ...................... F16H 21/44; H01H 35/34

[52] U.S. Cl. .................................... 74/100 P; 29/622; 200/83 P; 267/159

[58] Field of Search .............. 337/343, 365; 74/100 P; 267/158-161; 92/7; 200/83 P, 67 DB; 29/622, 173; 339/46

[56] References Cited

U.S. PATENT DOCUMENTS

| | | | |
|---|---|---|---|
| 2,953,658 | 9/1960 | Davis | 200/81 R |
| 3,177,313 | 4/1965 | Klimak | 200/83 P |
| 3,393,612 | 7/1968 | Gorgens | 92/101 |
| 3,755,770 | 8/1973 | Andersen | 337/354 |
| 4,091,249 | 5/1978 | Huffman | 200/83 P |

FOREIGN PATENT DOCUMENTS

| | | |
|---|---|---|
| 1028252 | 5/1966 | United Kingdom . |

*Primary Examiner*—Leon Gilden
*Attorney, Agent, or Firm*—Joseph E. Papin

[57] ABSTRACT

A snap-action member of a metallic material having a predetermined grain orientation and having at least one projection for locating the snap-action member in a preselected assembly position on seating means therefor in a control device thereby to align the predetermined grain orientation with respect to the seating means.

2 Claims, 10 Drawing Figures

SNAP-ACTION MEMBER

CROSS-REFERENCE TO RELATED APPLICATION

This application is a division of copending application Ser. No. 960,172 filed Nov. 13, 1978 (now U.S. Pat. No. 4,200,776 issued Apr. 29, 1980) and which is incorporated by reference in this application.

FIELD OF THE INVENTION

This invention relates generally to automotive type air conditioning systems and in particular to a method of making a control device therefor and a snap-action member adapted for use in a control device.

BACKGROUND OF THE INVENTION

In the past, various different types of past or prior art control devices, such as fluid pressure actuated switches for instance, were utilized in an automotive type air conditioning system to control the energization and deenergization of a clutch actuated compressor in such system in response to a preselected low and high value of fluid pressure measured at a preselected point in such system, such as in an accumulator of such system for instance.

Some of the past control devices were provided with a housing having an opening therethrough, and a movable fluid pressure responsive member, such as a diaphragm or the like for instance, was sealably interposed across the opening in the control device housing so as to define therein a pressure fluid chamber and a switch means accommodating chamber adjacent the opposite sides of the diaphragm, respectively. A round or disc-shaped snap disc movable between a stable configuration and an unstable configuration thereof was provided with a circumferential edge seated in the switch means accommodating chamber on the control device housing generally about the opening therein and adjacent the diaphragm, and a switch means operable generally between make and break positions for controlling a circuit through the control device was disposed in the switch means accommodating chamber generally adjacent the snap disc. Thus, the diaphragm was movable in response to a preselected fluid pressure acting thereon in the pressure fluid chamber to effect the application of a motive or applied force to the snap disc thereby to cause a snap-action movement of the snap disc from a stable configuration thereof toward a generally inverted or unstable configuration thereof. When the snap disc was so moved to its unstable configuration it effected the movement of the switch means from its break position to its make position. Thereafter, in response to a reduction of the fluid pressure in the pressure fluid chamber and a corresponding reduction in the motive force acting on the snap disc, the snap disc returned with snap-action from its unstable configuration to its stable configuration thereby to permit return movement of the switch means from its make position to its break position. Of course, in its make and break positions, the switch means completed and interrupted the circuit through the control device which effected the energization and deenergization of the aforementioned clutch controlled or actuated compressor, respectively.

In these past control devices, the round snap disc was formed from a generally thin strip or sheet of metallic material which may have had a directed grain orientation, such as for instance a stainless steel. In its assembly position, it is believed that the round snap disc was randomly arranged without regard to the grain orientation direction thereof so that the outer circumferential edge of the snap disc was disposed on a generally round or annular seating surface on the control device housing, and such seating surface was split or interrupted generally at diametrally opposite sections thereof. Also, a pair of oppositely spaced apart or split abutments were provided on the control device housing respectively adjacent the split seating surfaces and the round snap disc for abutting engagement therewith in order to positively limit the applied force movement or stroke of the round snap disc from the stable configuration to the unstable configuration thereof, as previously discussed. Thus, the round snap-disc was unsupported generally at the interrupted sections of the split-seat and also generally across the split abutments when engaged therewith.

During calibration testing of a plurality of the aforementioned prior art control devices in which the round snap disc was believed to be randomly seated in its assembly position therein without regard to the grain orientation direction of the snap disc, rather erratic calibration changes of the snap disc in most of such tested prior art control devices were encountered with most of such calibration changes exceeding a set limit or preselected allowable calibration change of the calibration test. Thus, it is believed that at least one of the disadvantageous or undesirable features of the prior art control devices was that the aforementioned unsupported engagement or arrangement of the snap disc on the split seat and/or the split abutments therefor caused the snap disc to assume a permanent set or deformation or the like. Another disadvantageous or undesirable feature of the prior art control devices which is analogous to the aforementioned disadvantageous feature is believed to be that the aforementioned deformation of the snap disc upon its engagement with the stops therefor deleteriously or adversely affected the calibration of the snap disc.

The calibration test to which the prior art control devices were subjected first involved ascertaining the initial "on" and "off" fluid pressures. The initial "on" fluid pressure is that necessary to effect the snap-action movement of the snap disc from the stable configuration to the unstable configuration thereof, and the initial "off" fluid pressure is that reduced fluid pressure at which the snap disc returns or snaps from the unstable configuration to the stable configuration thereof. Upon ascertaining these initial "on" and "off" fluid pressures at which the snap disc is actuated, a test fluid pressure of generally about 200 psig was applied to the past control devices to effect the snap-action movement of the snap disc to its unstable configuration in abutting engagement with the stops therefor, and while so pressurized, the past control device was subjected or heated to a test temperature of approximately 250° F. for a test period of about two hours. At the end of this test period, the past control device was permitted to cool to about room temperature, and thereafter, final "on" and "off" fluid pressures of the past control device were ascertained in the same manner as discussed above with respect to the initial "on" and "off" fluid pressures. Change in the calibration of the snap disc in the past control device was ascertained by comparing the differential between the respective initial and final "on" and "off" fluid pressures, and of course, if either of these differentials was greater than a preselected test calibration change (1.5 psi), then the past control device failed the test and was unacceptable for use in the aforementioned automotive air conditioning system.

SUMMARY OF THE INVENTION

Among the several objects of the invention may be noted the provision of an improved snap-action member for use in a control device which overcome the aforementioned disadvantageous or undesirable features, as well as others, of the prior art; the provision of such improved snap action member in which the direction of the grain orientation in a metallic material of a snap-action member is predeterminately arranged to strengthen portions of the snap-action member which are unsupported by a housing of the control device; the provision of such improved snap-action member having means associated therewith not only to indicate the direction of grain orientation in the metallic material from which the snap-action member is formed but also to insure the assembly of the snap-action member in a predetermined assembly position in the control device; and the provision of such improved snap-action member which simplistic in design, economical to manufacture, and easily assembled. These as well as other objects and features of the present invention will be in part apparent and in part pointed out hereinafter.

In general, a snap-action member in one form of the invention is adapted to be arranged on a split seat within a control device and with a part of the control device so as to at least limit the rotative displacement of the snap-action member generally about the split seat. The snap-action member comprises a body formed from a metallic material having a directed grain orientation and having a generally central arcuate portion with a stable configuration adapted to be generally inverted with the snap-action movement toward an unstable configuration. The body also has a peripheral portion integral with the central portion and arranged at least in part to be supported on the split seat. Means predeterminately arranged with respect to the direction of the grain orientation in the metallic material of the body is adapted for engagement with the control device part so as to locate the snap-action member generally against the rotative movement of the peripheral portion on the split seat and also align the grain orientation in the metallic material of the body generally in a predetermined assembly relation with respect to the split seat.

BRIEF DESCRIPTION OF THE DRAWINGS

Corresponding reference characters indicate corresponding parts throughout the several views of the drawings.

The exemplifications set out herein illustrate the preferred embodiments of the invention in one form thereof, and such exemplifications are not to be construed as limiting the scope of the invention in any manner.

DETAILED DESCRIPTION OF PREFERRED EMBODIMENTS

Figure 1:
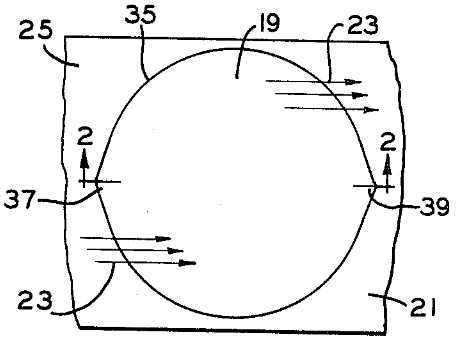
FIG. 1 is a plan view of a snap-action member in one form of the invention as formed from a generally thin sheet or strip of metallic material having a directed grain orientation.
Figure 2:
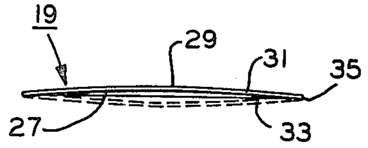
FIG. 2 is a sectional view taken along line 2—2 of FIG. 1.
Figure 3:
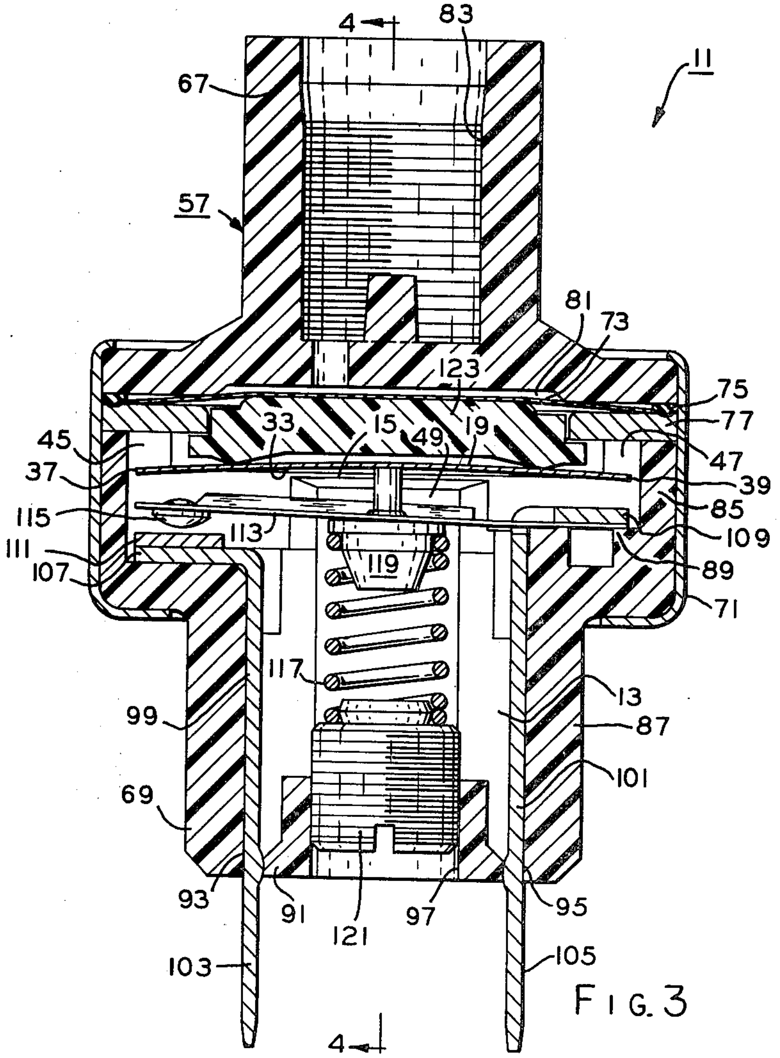
FIG. 3 is a sectional view showing a control device with the snap-action member of FIG. 1 seated therein and illustrating principles which may be practiced in a method of making or manufacturing a control device.

Referring now in general to the drawings, a method is illustrated for making or assembling a control device, such as for instance a fluid pressure actuated electrical switch 11, having an opening or passage means 13 therein with at least a pair of laterally spaced or oppositely spaced apart abutments or split stops 15, 17 within the opening and intersecting with a chord C thereof (FIG. 3). A mono-stable type snap-action member 19 in one form of the invention and disposed in opening 13 is operable between a stable configuration and an unstable configuration thereof with the snap-action member being engaged only in the unstable configuration thereof with abutments 15, 17 (FIGS. 1-3). In this method, snap-action member 19 is formed or otherwise shaped into its stable configuration from a metallic material 21, such as for instance a cold rolled stainless steel or the like, having a directed grain orientation, as illustrated by a plurality of arrows at 23 (FIGS. 1 and 2). Thereafter, snap-action member 19 is disposed, arranged or otherwise seated in the stable configuration thereof in control device 11 in a predetermined or preselected assembly position so as to extend at least in part generally about opening 13 in spanning relation therewith and in spaced relation with abutment pair 15, 17, and the direction of the grain orientation 23 in metallic material 21 of the snap-action member is predeterminately located or otherwise positioned or aligned so as to extend generally perpendicularly with respect to chord C of the opening (FIGS. 4, 5, 7 and 8).

More particularly and with specific reference to FIGS. 1 and 2, snap-action member 19 may be blanked, punched or otherwise formed or shaped from a generally thin sheet or strip 25 of grain oriented material 21 by suitable means well known to the art, such as for instance multiple die sets or the like; however, for the sake of brevity and drawing simplicity, the equipment and tooling necessary for forming the snap-action member from the strip of grain oriented metallic material as well as the description thereof is omitted. Upon the aforementioned forming of snap-action member 19 into the stable configuration thereof, it includes a body 27 having a generally arcuate or dome shaped generally central portion 29, and a pair of opposite generally arcuate or dome shaped sides or surfaces 31, 33 are provided on the body defining the central portion and interconnecting with an outer peripheral edge or parameter portion 35 which defines a generally constant diameter for the body about a major part of the body. A pair of generally oppositely extending interlocking means, such as projections or extensions 37,39 or the like for instance, are integrally formed on body 27 of snap-action member 19 between opposite surfaces 31,33 and peripheral edge 35, and it may be noted that such projections are predeterminately arranged so as to extend generally in the direction of the grain orientation 23 in strip 25 of metallic material 21 during the formation of snap-action member 19, as best seen in FIG. 1. Thus, opposite projections 37,39 serve not only to indicate the direction of grain orientation 23 in body 27 of snap-action member 19 after it has been severed from metallic material strip 25 but also may be utilized to insure or facilitate the desired assembly relation of the snap-action member in control device 11, as discussed hereinafter. While snap-action member 19 is illustrated herein for purposes of disclosure, it is contemplated that other snap-action devices, such as for instance a Belleville spring or a spider or spoke type snap spring or the like, may be utilized within the scope of the invention so as to meet the objects thereof. While projections 37,39 indicate the direction of grain orientation 23 in snap-action member 19, it is contemplated that other means may be associated or utilized with the snap-action member for indicating the grain orientation direction therein, such as for instance a paint, dye or score line across the snap-action member or perhaps just one grain orientation indicating projection.

A pair of seating means, such as for instance a pair of opposite generally arcuate seats 41,43 or the like, for snap-action member 19 is formed or otherwise provided on control device 11 generally about opening 13 therein and adjacent opposite abutments 15,17 and a pair of opposed means, such as for instance notches, grooves or interrupted sections 45,47, are also provided in the control device for interlocking with projections 37,39 of the snap-action member or for other positioning, locating or abutting engagement therewith. A channel means or other similar trough 49 is defined in control device 11 generally between abutments 15,17, and the channel means extends at least in part in a preselected direction across opening 13, as indicated by the directional arrow 51. It may be noted that notches 45,47 are arranged or otherwise aligned generally in in-line relation with channel means 49 in the preselected direction 51 thereof. Upon the assembly of snap-action member 19 in its predetermined assembly position or relation thereof within control device 11, peripheral edge 35 of the snap-action member is seated or otherwise arranged on seats 41,43 of the control device so that opening 13 therein is generally spanned by the snap-action member with surface 33 of central portion 29 spaced generally adjacent abutments 15,17 in facing relation therewith. As peripheral edge 35 of snap-action member 19 is assembled onto seats 41,43 of control device 11, as described above, opposite projections 37,39 are inserted into opposed notches 45,47 in the control device so as to be engaged or otherwise abutted with confronting parts of the control device at least generally adjacent the notches thereby generally to prevent or at least limit rotative displacement movement of the snap-action member from its predetermined assembly position on the seats about opening 13. In this manner, the locating or abutting engagement of opposite projections 37,39 on snap-action member 19 with notches 45,47 in control device 11 predetermines the assembled relation or direction of grain orientation 23 in metallic material 21 of the snap-action member with respect to both seats 41,43 and abutments 15,17. Thus, when snap-action member 19 is arranged in its predetermined assembly position, the direction of grain orientation 23 in metallic material 21 of the snap-action member is arranged generally in parallel relation with an imaginary line, such as for instance along directional arrow 51 indicating the preselected direction of channel means 49, and such imaginary line intersects with or runs between opposed notches 45,47 and is spaced generally laterally between abutments 15,17. In other words, with chord C of opening 13 located so as to intersect with a pair of oppositely or laterally spaced apart points, indicated at 53,55 on abutments 15,17, respectively, the direction of grain orientation 23 in metallic material 21 of snap-action member 19 will extend or be arranged generally perpendicularly with chord C when the snap-action member is seated in its predetermined assembly position within control device 11. In view of the above, when snap-action member 19 is engaged with seats 41,43, the snap-action member is unsupported at generally opposite portions or sections thereof across notches 45,47, and when the snap-action member is operated to its unstable configuration into engagement with abutments 15,17, as discussed in detail hereinafter, the snap-action member is also unsupported along a portion or section thereof across channel means 49 between the abutments. Since snap-action member 19 is strongest in the direction of the directed grain orientation 23 in metallic material 21 thereof, it is believed that the alignment of the directed grain orientation generally in parallel relation with the preselected direction 51 of channel means 49 and/or between notches 45,47 at least alleviates a tendency of the snap-action member to assume a permanent set or deformation generally at the above discussed unsupported portions or sections thereof when the control device is actuated, as discussed in detail hereinafter.

Figure 4:
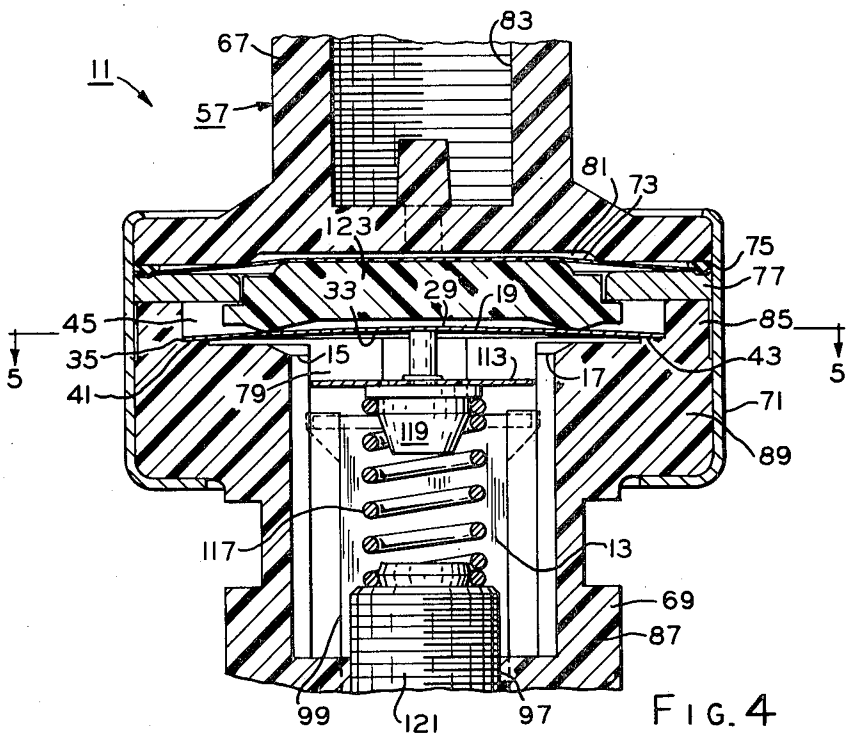
FIG. 4 is a sectional view taken along line 4—4 of FIG. 3.
Figure 6:
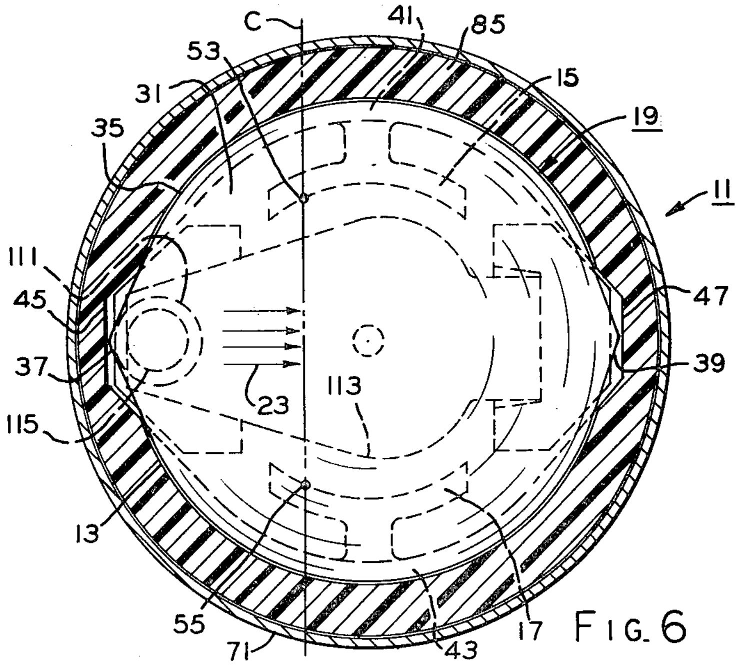
FIG. 6 is the same as FIG. 5 with the snap-action member seated in a predetermined assembly position in the control device so as to illustrate the direction of the grain orientation in the snap-action member with respect to other component parts of the control device.
Figure 5:
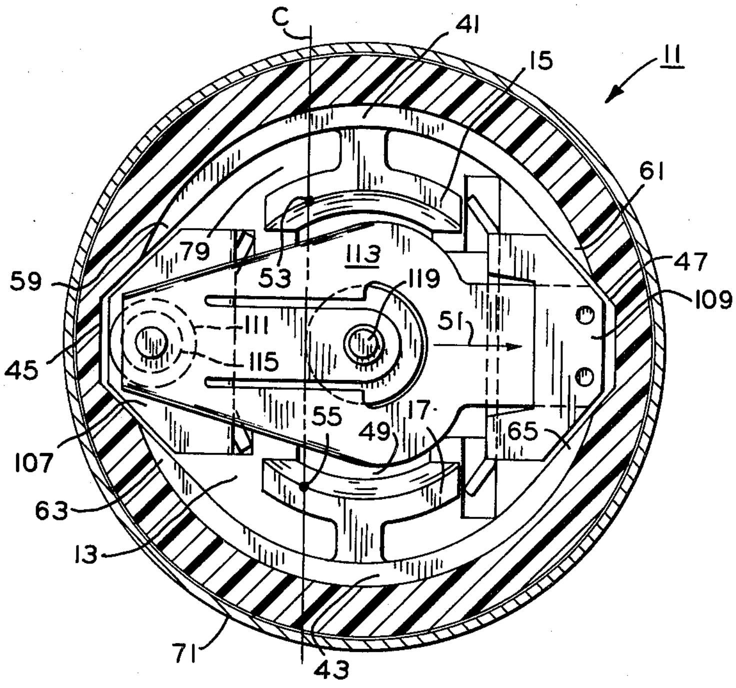
FIG. 5 is a sectional view taken along line 5—5 of FIG. 4 with the snap-action member removed to illustrate with clarity other components of the control device.

Referring again in general to the drawings and recapitulating at least in part with respect to the foregoing, control device 11 is provided with a housing or casing 57 having opening 13 therein, and split seats 41,43 are arranged or otherwise disposed at least generally adjacent or about the opening with the seats respectively having opposite ends or end portions 59,61 and 63,65 (FIGS. 3–5). Notches 45,47 are arranged in housing 57 at least in part between adjacent opposite ends 59,63 and 61,65 of seats 41,43, and abutments 15,17 are arranged in the housing generally adjacent the seats between the opposite ends 59,61 and 63,65 thereof, respectively (FIG. 5). Snap-action member 19 in one form of the invention is formed from metallic material 21 having directed grain orientation 23, and the snap-action member is disposed or otherwise seated in its assembly position on seats 41,43 in spaced relation with abutments 15,17 (FIGS. 1–3). Snap-action member 19 includes projections 37,39 extending generally in the direction of the grain orientation 23 in metallic material 21 of the snap-action member, and the projections are arranged with notches 45,47 or otherwise extend thereinto so as to generally maintain the snap-action member against displacement movement about opening 13 from the predetermined assembly position of the snap-action member on seats 41,43 (FIGS. 1–3 and 6).

More particularly and with specific reference to FIGS. 3–6, housing 57 includes a pair of upper and lower housing members or portions 67,69 which may, if desired, be formed of a suitable dielectric material, such as a resin for instance, and means, such as a metallic sleeve 71 or the like for instance, is connected or grippingly engaged with the housing portions for displacement preventing engagement therewith. Although housing portions 67,69 are shown for purposes of disclosure, it is contemplated that one of the housing portions might be metallic and directly connected to the other of the housing portions within the scope of the invention so as to meet the objects thereof. A resilient or flexible diaphragm 73 of suitable material is sealably interposed between a sealing means, such as an O-ring seal 75 or the like for instance, and an annular metallic washer 77, and the O-rings and washer are respectively abutted between opposed adjacent ends of upper and lower housing portions 67,69. Thus, diaphragm 73 extends in sealing relation between housing portions 67,69 and across the upper or one end of opening 13 in lower housing portion 69 thereby to define therein a switch means accommodating chamber 79. Diaphragm 73 also defines with upper housing portion 67 an expansible fluid pressure chamber 81 therein, and a threaded control port 83 adapted for connection with a source of variable fluid pressure (not shown) is provided in the upper housing portion in pressure fluid communication with chamber 81 therein.

Housing portion 69 is provided with a plurality of walls or wall means defining opening 13 therein and includes at least a pair of generally cylindric stepped walls 85,87 with an integral generally radially extending wall defining an annular shoulder 89 therebetween. The lower end of the smaller stepped wall 87 is provided with an integral traverse end or closure wall 91 having a pair of spaced apart terminal receiving slots 93,95 and a generally centrally located threaded aperture 97 extending therethrough between the terminal receiving slots. The upper or abutment end of larger stepped wall 85 is retained in abutment with annular washer 77 by the displacement preventing engagement of sleeve 71 with housing portions 67,69 as previously mentioned, and seats 41,43 are formed on the larger stepped wall between the upper end thereof and shoulder 89 in a plane generally vertically spaced from the upper end of the larger stepped wall. Opposed notches 45,47 are also provided in larger stepped wall 85 between the upper end thereof and shoulder 89 intersecting with seats 41,43 generally between opposite ends 59,61 and 63,65, respectively. While seats 41,43 are disclosed herein as generally arcuate surfaces on housing portion 63, it is contemplated that other seats having different shapes may be employed within the scope of the invention so as to meet the objects thereof. Opposite abutments 15,17 are integrally formed on shoulder 89 and extend upwardly therefrom so that such abutments are disposed in a plane spaced vertically downwardly with respect to seats 41,43 and generally radially spaced adjacent thereto within opening 13. Thus, it may be noted that abutments 15,17 are respectively spaced radially inwardly of seats 41,43 generally midway thereof so as to be located generally between notches 45,47 and on opposite sides thereof and also between the opposite ends 59,61 and 63,65 of the seats. In other words and as previously mentioned, abutments 15,17 are arranged generally across or on opposite sides of channel means 49 in an alignment or preselected direction, as indicated by directional arrow 51, with respect to notches 45,47 so that chord C of opening 13 intersecting with opposite or laterally spaced points 53,55 on the abutments is generally perpendicular to the aforementioned imaginary line or diameter, i.e., extending generally along directional arrow 51, across the opening between the notches. While abutments 15,17 are illustrated as being generally arcuate in shape, it is contemplated that other types of abutments, different in both shape and number from abutments 15,17, may be employed as stops for snap-action member 19 within the scope of the invention so as to meet the objects thereof.

At least a part of peripheral portion 35 on snap-action member 19 is disposed or otherwise seated in abutting engagement on seats 41,43 of housing portion 69 so that the snap-action member generally spans opening 13, and opposite projections 37,39 of the snap-action member extend into opposed notches 45,47 in larger stepped wall 85 of the housing portion so that the projections are positioned for respective abutting engagement with confronting parts of the housing portion defining the notches, i.e., opposed sidewalls of the notches. Thus, the abutment of projections 37,39 and notches 45,47 not only serves to prevent or at least limit rotational displacement or displacement movement of snap-action member 19 about its seats 41,43 but also serves to insure or maintain the disposition of the snap-action member in its assembly position on the seats so that the direction of grain orientation 23 is predeterminately located or aligned with respect to abutments 15,17 and the seats. In other words, the engagement of projections 37,39 on snap-action member 19 with notches 45,47 in housing portion 69 insures that the grain orientation direction 23 of the snap-action member is always disposed generally parallel with the aforementioned imaginary line or opening diameter, i.e., extending generally along directional arrow 51 of channel means 49 between the notches and also generally perpendicular to the chord C of opening 13 intersecting with laterally spaced points 53,57 on abutments 15,17, respectively. It is believed that predetermining the assembly position of snap-action member 19 within control device 11 so that the grain orientation 23 of the snap-action member is predeterminately aligned or located in a direction extending generally toward or between notches 43,45 of housing portion 69 and generally laterally with respect to abutments 15,17 thereof at least alleviates the permanent set or deformation condition of the snap-action member in response to the applied force movement thereof into engagement with the abutments. Of course, while the grain orientation direction 23 of the snap-action member is predeterminately aligned or arranged in control device 11, as discussed in detail hereinabove, it is believed that the grain orientation may be angularly displaced within a predefined or preselected range with respect to abutments 15,17 and notches 43,45 in housing portion 69 within the scope of the invention so as to meet the objects thereof.

A pair of opposite spaced apart terminals or terminal means 99,101 are fixedly arranged on lower stepped wall 81 and shoulder 83 of housing portion 69 within opening 13 thereof, and the terminals have electrical connector sections or end portions 103,105 extending through terminal slots 93,95 in closure wall 91 of the housing portion exteriorly thereof, respectively. Terminals 99, 101 also include switch means supporting sections or interior end or flanged portions 107,109 which overlay shoulder 83 of housing portion 69 within opening 13 thereof so as to extend generally into notches 45,47, and a stationary contact or contact means 111 is carried on interior end 107 of terminal 99. A resilient current carrying switch arm 113 has one end thereof pivotally connected to interior end portion 109 of terminal 101, and a movable contact or contact means 115 is carried on the other or opposite end portion of the switch arm for circuit making engagement with and circuit breaking disengagement from contact 111. Thus, switch arm 113 and cooperating contacts 111,115 define a switch means for switching between a pair of circuit controlling positions in which the contacts are respectively made and broken.

A resilient means, such as a coil or range spring 117, is biased or interposed between a retainer 119 therefor and a spring force adjusting member or screw 121 which is threadedly and adjustably received in threaded aperture 97 provided therefor in closure wall 91 of housing portion 69. Spring 117 urges its retainer 119 toward engagement with switch arm 113 and also with lower arcuate surface 33 of snap-action member 19; therefore, when the snap-action member is in its stable configuration, the switch arm is urged by the spring toward an open or circuit interrupting position disengaging or breaking contact 115 from contact 111, as best seen in FIG. 3. To complete the description of control device 11, a spacer or force applying means or member 123 which may be formed of any suitable material, such as a resin or the like for instance, is received within washer 77 and in abutment or force applying engagement between diaphragm 73 and upper arcuate surface 31 of snap-action member 19.

In the operation of control device 11 with the components thereof disposed in their respective assembled or at-rest positions, as illustrated in FIGS. 3 and 4, assume that the fluid pressure in pressure fluid chamber 81 of the control device is selectively increased to a preselected "on" value great enough to effect the actuation of the control device. This preselected fluid pressure in chamber 81 acts on the effective area of diaphragm 73 to establish an applied or actuating force which is transferred from the diaphragm to spacer 123 and onto central portion 29 of snap-action member 19 when it is in the at-rest position or stable configuration thereof. The applied force so exerted on central portion 29 of snap-action member 19 effects the operation of at least the central portion from the stable configuration with snap-action movement to the unstable configuration thereof, i.e., the snap-action member assumes a generally inverted position in response to the applied force acting thereon. In response to this snap-action movement toward its unstable configuration or inverted position, snap-action member 19 moves or otherwise conjointly drives spring retainer 119 generally downwardly against the compressive force of range spring 117, and at the same time, also effects the pivotal movement of switch arm 113 generally about interior end 109 of terminal 101 so as to move contact 115 on the switch arm into making engagement with its cooperating contact 111 thereby to complete a circuit through the control device, i.e., through switch arm 113 between terminals 99,101. Of course, upon the above described inversion action of snap-action member 19 to the unstable configuration thereof, central portion 29 thereof is driven or moved into stroke or motion limiting engagement with abutments 15,17. Thus, it may be noted that at least a portion or part of the applied force acting on snap-action member 19 is transferred through peripheral portion 35 thereof onto seats 41,43 and when central portion 29 of the snap-action member is engaged with abutments 15,17, at least a portion or part of the applied force is also transferred through the central portion onto the abutments. As a result of this exertion of the applied force onto central portion 29 and peripheral portion 35 of snap-action member 19, it is believed that the unsupported sections thereof spanning channel means 49 and notches 45,47, respectively, have a tendency to distort or take a permanent set. However, as previously mentioned, since snap-action member 19 is stronger generally in the direction of the directed grain orientation 20 in metallic material 21 thereof, it is believed that the aforementioned tendency of the snap-action member to permanently deform is at least alleviated by arranging the snap-action member in its preselected assembly position so that the directed grain orientation thereof extends or runs generally in parallel relation with directional arrow 51, i.e., in the direction of channel means 49 and between notches 45,47. In this manner, it is believed that the unsupported sections of snap-action member 19 which span notches 45,47 and channel means 49 are strengthened by the directed grain orientation 23 in metallic material 21 of the snap-action member when it is arranged in the preselected assembly position thereof; therefore, the aforementioned alleviation of the deformation which may occur in the snap-action member permits the use thereof within the preselected calibration range for which the snap-action member is designed.

When the applied fluid pressure in pressure fluid chamber 81 is reduced to another preselected or "off" value predeterminately less than the aforementioned preselected "on" value thereof, the applied force acting on snap-action member 19 is, of course, correspondingly reduced, and in response to such reduced applied force, central portion 29 of the snap-action member operates so as to revert or return with snap-action movement from the unstable configuration to the stable configuration thereof. This return movement of snap-action member 19 to its stable configuration is assisted by the compressive force of range spring 117 which urges or moves its retainer 119 toward following engagement with the snap-action member. Upon this reversion of snap-action member 19 to its stable configuration, the following movement therewith of retainer 119 in response to the compressive force of range spring 117 is effective to pivotally return switch arm 113 toward its open or at-rest position breaking contact 115 thereon from contact 111. In this manner, the breaking of contacts 111,115 effects the interruption of the circuit through control device 11 between terminals 99,101 thereof.

Figure 7:
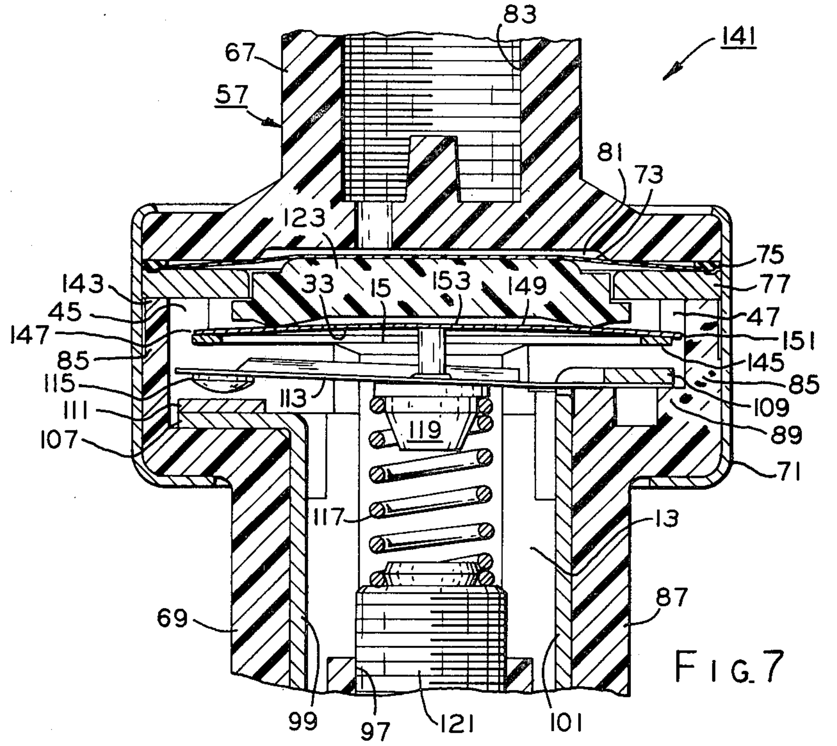
FIGS. 7 and 8 are partial sectional views illustrating an alternative snap-action member in one form of the invention seated in a control device and illustrating principles which may be practiced in an alternative method of making or manufacturing a control device, respectively.
Figure 8:
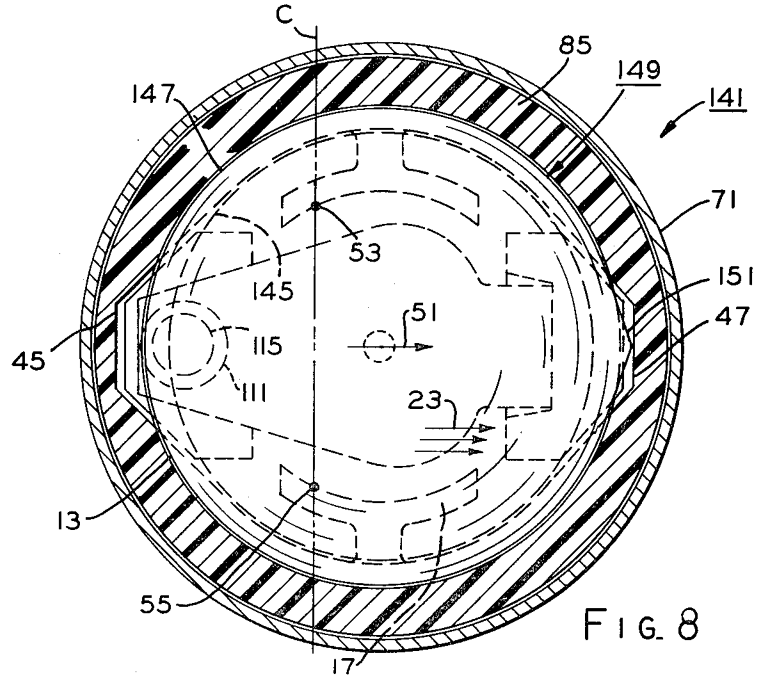

Referring now to FIGS. 7 and 8, an alternative method of making a control device 141 is illustrated with the control device 141 having generally the same component parts and functioning generally in the same manner as the previously described control device 11 with the exceptions noted hereinbelow. While the method of making control device 141 meets at least some of the objects set out hereinabove, it is believed that such method may also have other objects of its own which will be either in part pointed out or in part apparent from the following discussion with respect to control device 141.

In control device 141, larger stepped wall 85 of housing portion 69 is extended at 143 in order to accommodate metallic ring or washer 145 defining a full or circular seat or seating means about opening 13 on which a peripheral portion 147 of a mono-stable snap-action member 149 is seated in the predetermined assembly position thereof. Snap-action member 149 in one form of the invention is generally the same as the previously described snap-action member 19 with the exception that snap-action member 149 has only a single interlocking means or projection 151 integrally formed between arcuate surfaces 31,33 and peripheral or parameter portion 147 thereof. Thus, projection 151 extends generally so as to indicate the direction of the grain orientation 23 in metallic material 21 of snap-action member 149, and in the predetermined assembly position of the snap-action member, the single projection thereof may be disposed or otherwise arranged in locating or abutting engagement with either of notches 45,47 in lower housing portion 69. In this manner, the abutment between projection 151 of snap-action member 149 with either one of notches 45,47 prevents or at least limits rotational displacement movement of the snap-action member from its predetermined assembly position on full circular seat 145 therefor and also maintains the direction of the directed grain orientation 23 in metallic material 21 of the snap-action member generally in parallel relation with directional arrow 51 which indicates the preselected direction in which channel means 49 extends between abutments 15,17. Thus, while full circle seat 145 supports snap-action member 149 about its peripheral portion 147, i.e., across notches 45,47, dome shaped or generally arcuate portion 153 is unsupported across channel means 49 when it is operated or actuated from the stable configuration to the unstable configuration thereof into engagement with abutments 15,17. Since snap-action member 149 is strongest in the direction of the directed grain orientation 23 in metallic material 21 thereof, it is believed that the tendency of the snap-action member to assume a permanent set or deformation when the central portion 153 thereof is engaged with abutments 15,17 is at least alleviated by arranging the snap-action member in its preselected assembly position so that the directed grain orientation 23 thereof extends or runs generally in parallel relation with the directional arrow 51, i.e., in the direction of channel means 49 generally across opening 13. As a result, the aforementioned alleviation of the deformation which may occur in snap-action member 149 permits the use thereof within the preselected calibration range for which it was designed. Although both of notches 45,47 are provided in control device 141, it is contemplated that only one of such notches may be employed within the scope of the invention so as to meet the objects thereof. Furthermore, since full circular seat 145 is employed to support peripheral portion 147 of snap-action member 149 across notches 45,47, it is contemplated that the preselected direction, as indicated by directional arrow 51, of channel means 49 may extend in any other selected or desired direction other than between notches 45,47. However, in the event that abutments 15,17 were repositioned so that channel means 49 therebetween extended in the aforementioned any other direction (i.e., other than between notches 45,47), it is contemplated that snap-action member 149 would be formed so that the directed grain orientation 23 in metallic member 21 thereof would be disposed generally in the parallel relation with the extent of such repositioned channel means between such repositioned abutments when the snap-action member is in its preselected assembly position within the scope of the invention so as to meet the objects thereof.

Figure 9:
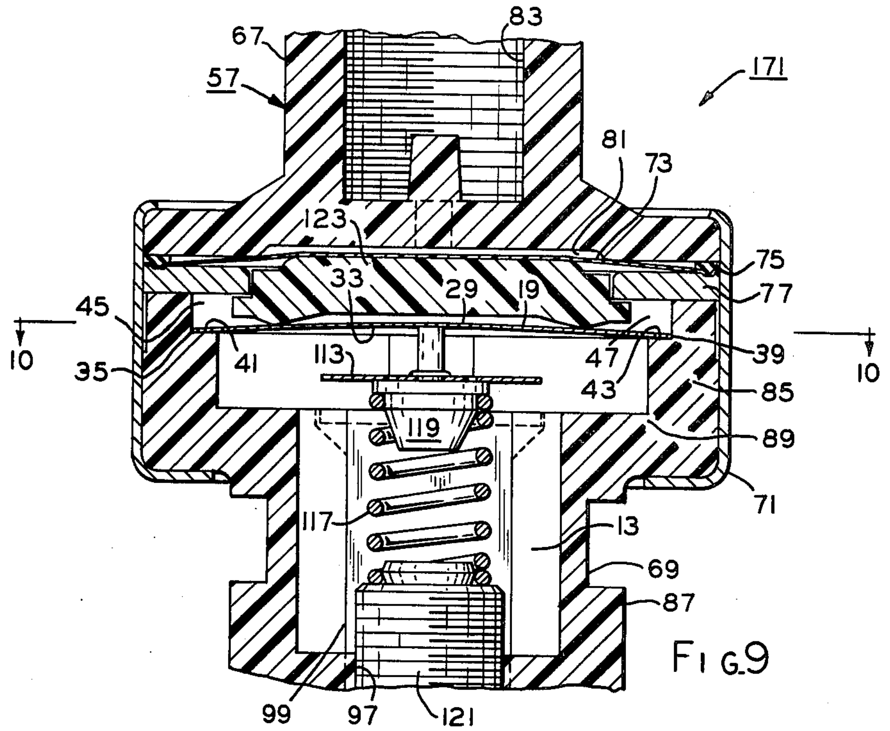
FIGS. 9 and 10 are partial sectional views illustrating principles which may be practiced in another alternative method of making or manufacturing a control device, respectively.
Figure 10:
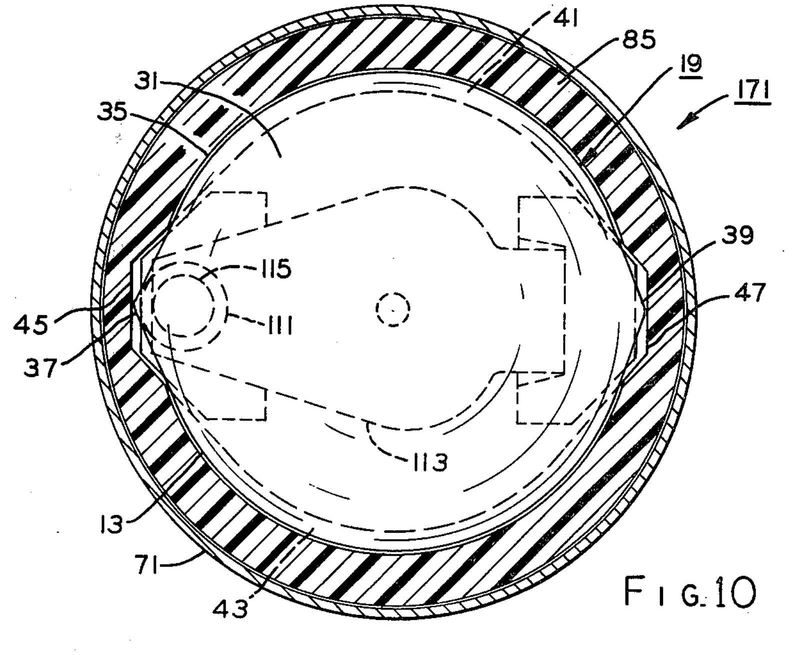

Referring now to FIGS. 9 and 10, another alternative method of making a control device 171 is shown with control device 171 having generally the same component parts and functioning generally in the same manner as the previously described control device 11 with the exceptions noted hereinbelow. While the method of making control device 171 meets at least some of the objects and advantageous features discussed above with respect to control device 11, it is believed that the method of making control device 171 may also have indigenous objects and advantageous features which will be either in part pointed out or in part apparent from the following discussion of control device 171.

Assuming that control device 171 may be actuated in response to fluid pressure having lesser preselected "on" and "off" values than those contemplated to effect the operation of control device 11, then it may be desirable or expedient to eliminate abutment 15,17 from lower housing portion 69 of control device 11. Thus, with abutments 15,17 so eliminated, any abutting engagement therewith of control portion 29 on snap-action member 19 is also eliminated upon the operation of the control portion to its unstable configuration, as previously discussed. Therefore, in control device 171, the direction of directed grain orientation 23 in metallic material 21 of snap-action member 19 in its preselected assembly position is aligned so as to extend generally in the parallel relation between notches 45,47.

In view of the foregoing, it is now apparent that novel snap-action members 19, 149 are presented meething the objects and advantages therefor as discussed hereinabove, as well as others, and that changes as to the precise configurations, arrangements, details and constructions illustrated herein by way of example may be made by those having ordinary skill in the art without departing from the spirit of the invention or the scope of the invention as set out in the claims which follow.

What I claim as new and desire to secure by Letters Patent of the United States is:

1. A snap-action member adapted to be disposed in a predetermined assembly position on means for seating it within a control device and engaged with a part of the control device so as to maintain the snap-action member against displacement movement generally about the seating means from the predetermined assembled position of the snap-action member thereon, the snap-action member comprising:

a body formed from a metallic material having a grain orientation extending thereacross in a predetermined direction;

a peripheral portion on said body defining a generally constant diameter of said body at least about a major portion thereof and adapted to be seated on the seating means in the control device;

a pair of spaced apart surfaces on said body interconnected with said peripheral portion and arcuately displaced in a direction generally perpendicular to a plane intersecting with said peripheral portion, respectively; and at least one projection on said body between said peripheral portion and said surface pair and predeterminately arranged so as to extend generally in the predetermined direction of the grain orientation in said metallic material of said body, said at least one projection being adapted to engage the control device part so as to locate the snap-action member in its preselected assembly position generally against the displacement movement about the seating means in the control device and thereby align the predetermined direction of the grain orientation in the metallic material of said body with respect to at least the seating means when said snap-action member is disposed thereon in the predetermined assembled position.

2. A snap-action member adapted to be arranged on a split seat within a control device and with a part of the control device so as to at least limit rotative displacement movement of the snap-action member generally about the split seat, the snap-action member comprising:

a body formed from a metallic material having a directed grain orientation and having at least a generally central arcuate portion with a stable configuration adapted to be generally inverted with the snap-action movement toward an unstable configuration, a peripheral portion on said body integral with said central portion and arranged at least in part to be supported on the split seat, and means predeterminately arranged with respect to the direction of the grain orientation in said metallic material of said body and adapted for engagement with the control device part so as to locate said snap-action member generally against the rotative displacement movement of said peripheral portion on the split seat and also align said grain orientation in said metallic material of said body generally in a predetermined assembly relation with respect to the split seat.

* * * * *